March 31, 1931.   W. BAUERSFELD ET AL   1,798,396
STEREOPHOTOGRAMMETRIC MEASURING APPLIANCE
Filed March 9, 1929
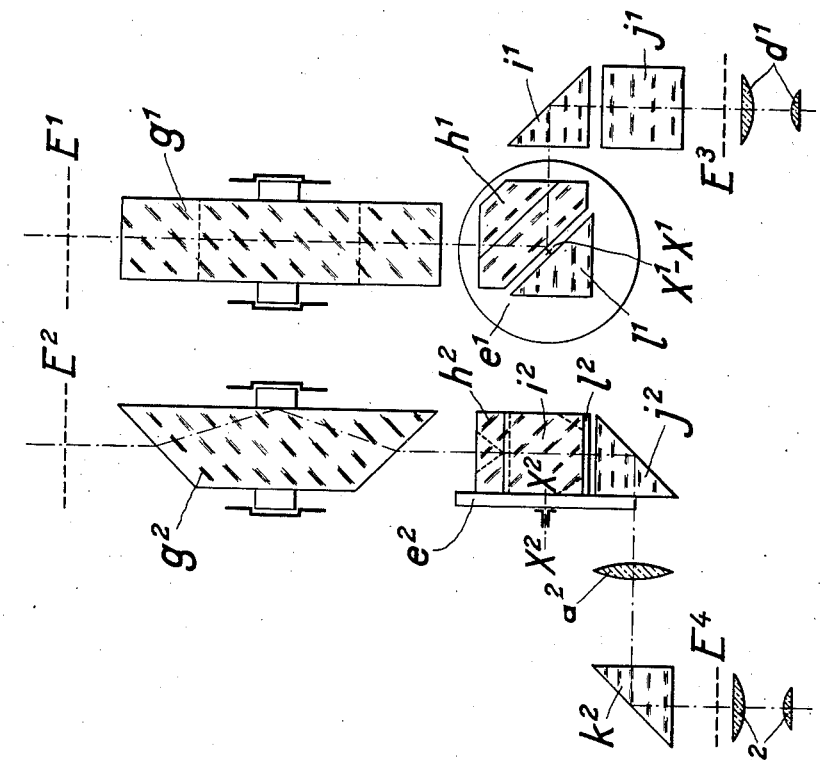
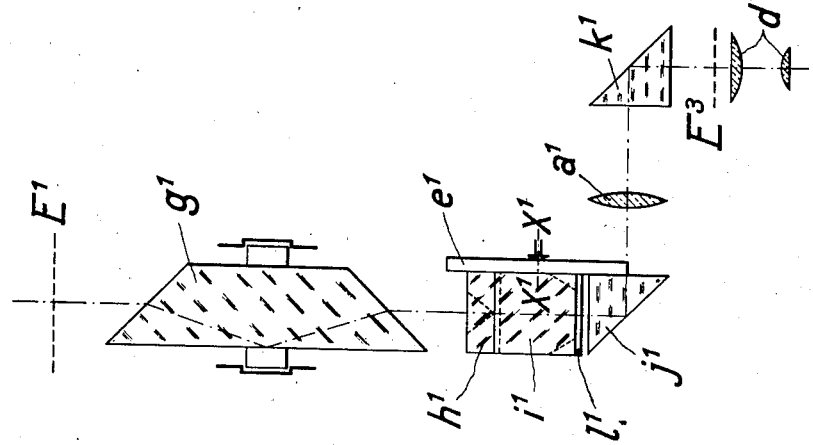
Inventors:
Walther Bauersfeld
Otto von Gruber Patented Mar. 31, 1931

1,798,396

UNITED STATES PATENT OFFICE

WALTHER BAUERSFELD, OF JENA, AND OTTO von GRUBER, OF STUTTGART, GERMANY, ASSSIGNORS TO THE FIRM CARL ZEISS, OF JENA, GERMANY

STEREOPHOTOGRAMMETRIC MEASURING APPLIANCE

Application filed March 9, 1929, Serial No. 345,637, and in Germany March 6, 1928.

The invention relates to a double microscope for stereoscopic measuring instruments.

In order to be specially adapted for measuring pairs of images of which the separate images belong to a continuous series of overlapping images, such microscope must be constructed in such a way that either the normal stereoscopic or a pseudo-stereoscopic impression may be obtained.

Hitherto the change from the one stereoscopic impression to the other was made possible by a double microscope so constructed that each of the two pencils of rays coming from the two images was conveyed at will to the one or the other of the oculars of the double microscope.

According to the invention the change from the one to the other stereoscopic impression is arrived at by presenting to each eye one and the same image, however in such a manner that this image is seen alternatively laterally correct and laterally reversed. The invention affords a corresponding solution which is distinguished by simple construction, when two interchangeable systems of reflectors (prism systems) of which the one has an even and the other an odd number of reflecting surfaces are so arranged that always one of the two systems is outside the paths of rays of the double microscope.

This solution affords a laterally reversed spatial image of the object given by the pair of images to be measured. The observation of such spatial image can be effected without any difficulty whatever.

Of the accompanying drawings, which illustrate the invention in a schematic example of a double microscope with interchangeable prism systems, Figure 1 represents a cross section along the optical axes of the double microscope, and Figure 2 a lateral view.

In Figures 1 and 2, $E^1$ and $E^2$ are two image planes on each of which, by means of special lens systems (which are left away in the drawing for the sake of simplicity), a real half image of a mark is projected. Two objectives $a^1$ and $a^2$ together with reversing prisms $g^1$ and, respectively $g^2$, which latter are rotatable on the optical axis, and roof prisms $h^1$ and $h^2$ respectively as well as with three single reflecting prisms $i^1$, $j^1$ and $k^1$ and, respectively $i^2$, $j^2$ and $k^2$ image these half images on the planes $E^3$ and, respectively, $E^4$. Eyepieces $d^1$ and $d^2$ arranged behind these two planes allow the observation. Each of the two roof prisms $h^1$ and $h^2$ is mounted on a carrier formed by a plate $e^1$ and, respectively $e^2$, which two plates are rotatably arranged on axes $X^1$—$X^1$ and $X^2$—$X^2$ respectively and provided with single reflecting prisms $l^1$ and, respectively, $l^2$ in such a manner that a turning of the plate by 180° will interchange the roof prisms $h^1$, and, respectively, $h^2$ with the single reflecting prisms $l^1$ and, respectively, $l^2$.

The position of the reversing prisms $g^1$ and $g^2$ and the plates $e^1$ and $e^2$, as drawn in the figures, makes it possible for an observer to see laterally correct upright half images. When the following plate of a series of photograms should be combined with one of the image plates corresponding to these half images and when photograms are in question which were taken with objectives with nearly vertical direction of axis, only the reversing prisms $g^1$ and $g^2$ are to be turned by 90° each. However, in the case of photograms taken at a greater angle to the vertical line, the two plates $e^1$ and $e^2$ are to be turned by 180° each.

We claim:

A double microscope for stereoscopic measuring instruments, each half of which comprises a carrier and two reflecting systems of which the one has an even and the other an odd number of reflecting surfaces, these reflecting systems being fixed on the said carrier, the carrier being movably mounted, and means being provided for moving the carrier in such a way that either of the reflecting systems may be inserted in the path of the light rays.

WALTHER BAUERSFELD.
OTTO von GRUBER.